Patented July 13, 1954

2,683,730

UNITED STATES PATENT OFFICE 2,683,730

POLYISOCYANATES AND MIXTURES THEREOF

Nelson V. Seeger and Ernest E. Fauser, Cuyahoga Falls, Ohio, assignors, by mesne assignments, to The Goodyear Tire & Rubber Company, a corporation of Ohio No Drawing. Application January 17, 1951, Serial No. 206,506

10 Claims. (Cl. 260—453)

This invention relates to new compositions of matter and to methods for their preparation. More particularly, it relates to organic polyisocyanates and still more particularly to mixtures of organic polyisocyanates and to methods for their preparation.

The broad object of this invention is to provide for the preparation of polyisocyanates and mixtures thereof which contain a controlled maximum amount of the diisocyanate. A particular object of this invention is the preparation of polyisocyanates from relatively inexpensive raw materials. Other objects will appear as the description proceeds.

According to the practice of this invention, an aryl mono primary amine in controlled molecular amounts is reacted with an aliphatic or aromatic aldehyde or ketone in controlled molecular amounts to yield a mixture of secondary polyamines. These secondary amines are subjected to rearrangement to primary polyamines by means of a mineral acid. The primary polyamines are then phosgenated to the polyisocyanates.

Using aniline as a representative aryl mono primary amine and formaldehyde as a representative aldehyde, typical reactions are believed to take place as follows:

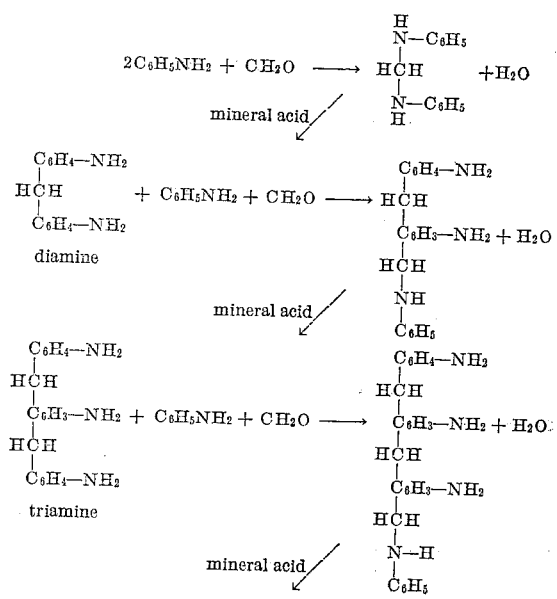

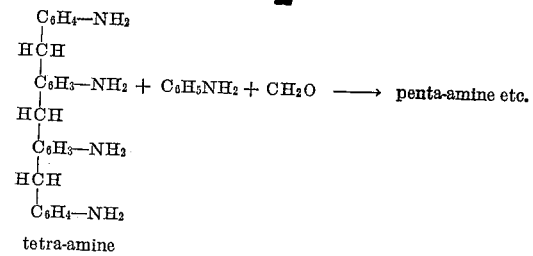

The polyamines formed as indicated are converted to the polyisocyanates by reaction with phosgene. It should be understood that the formation of the polyamines is not a step-wise reaction but rather a reaction in which the formation of the diamine, triamine, tetra-amine, and higher amines is proceeding simultaneously with the result that the completed reaction product is a mixture of the polyamines. The mineral acid is present in the reacting mixture to accomplish the rearrangement of the secondary amino groups as they form in the construction of the polyamine molecule. It is believed that the rearrangement occurs after the secondary amino group forms and before the next higher polymer is formed by reaction with another molecule of amine and aldehyde or ketone.

This invention is concerned with the formation of mixtures of polyisocyanates in which the diisocyanate portion is present in an amount not to exceed approximately 40% by weight of the mixture. This is accomplished by controlling the molecular ratio of amine to aldehyde or ketone in a range of from 4:2.5 to 4:3.5 with the amine being present in the larger molecular amount. A ratio of 4:2.5 yields a mixture of polyamines containing approximately 40% diamine by weight, while increasing the aldehyde or ketone to a ratio of 4:3.5 yields a mixture containing approximately 15% diamine by weight, with the balance in each case being the triamine, and higher amines. The polyamine mixtures are reacted with phosgene, as indicated, to obtain a mixture of polyisocyanates.

The mixture of polyisocyanates resulting from reacting the polyamines with phosgene may be used to advantage in polymeric reactions with compounds containing reactive hydrogens. The diisocyanate portion of the mixture can be substantially removed therefrom by distillation. Separation of the higher polyisocyanates is more difficult since these materials are resinous in character. The separation of the mixture of polyisocyanates into its components is not necessary for some uses as, for instance, in the cross-linking of the diisocyanate-modified polyesters and polyesteramides described in co-pending applications Serial Nos. 170,055 and 170,056, filed June 23, 1950, both now abandoned. When employed in such reactions, the mixtures of polyisocyanates containing up to 40% by weight of the diisocyanate may prove advantageous, or the diisocyanate may be substantially removed by distillation of the product leaving a mixture containing polyisocyanates with more than two —NCO equivalents per mol. The latter "purified" mixture may also be used as cross-linking agents for diisocyanate-modified polyesters and polyesteramides where the important consideration is not the purity of the reactant used, but rather the number of —NCO equivalents present in a given amount of the reactant.

The number of —NH$_2$ or —NCO groups in a given amount of the mixtures of reaction products can be determined by titration procedures well known in the art. The determinations show the neutral equivalent of the polyamines and the amine equivalent of the polyisocyanates. The amine equivalent is defined as the number of grams of isocyanate which is consumed by one gram mol of a secondary amine, such as di-n-butyl amine, in the formation of the corresponding urea. The procedure involved in making this determination is described in an article by Siggia and Hanna, Ind. and Eng. Chem. Analytical Ed. 20, 1084 (1948). Since the amine equivalent of any pure diisocyanate is known, it is possible to determine the presence of the higher polyisocyanates by analyzing the mixture to show an amine equivalent higher than the theoretical equivalent of the diisocyanate.

In the formation of the polyamine molecule it is believed that the carbon atom of the aldehyde or ketone which attaches to the arylene nucleus is located in a position para to the nitrogen unless that position is blocked by the presence of another substituent in which case the linkage is probably in a position ortho to the nitrogen. It is possible that in the formation of the polyamine more than two substitutions in the arylene nucleus will result. For instance, again taking aniline and formaldehyde as representative reactants, it is possible that a polyisocyanate molecule of the following formula could be present in the reaction product, substitution occurring in the para and ortho positions:

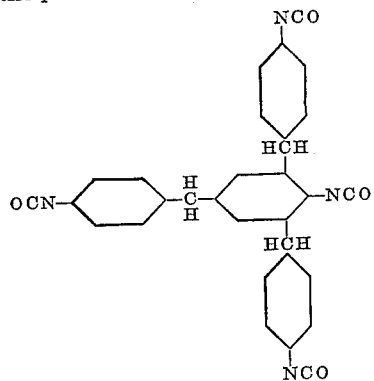

A structural formula which defines the mixture of polyisocyanates in the reaction product is

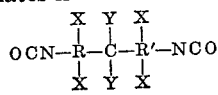

in which R and R' are arylene radicals, Y is selected from the group consisting of hydrogen, alkyl, and aryl radicals, and X is selected from the group consisting of hydrogen and a radical defined by the formula

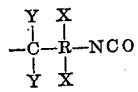

in which R, X, and Y as defined above.

Alternatively the mixture of polyisocyanates may be described as corresponding to the formula

in which R and R' are arylene radicals, Y is selected from the group consisting of hydrogen, alkyl, and aryl radicals, n is a whole number, and the (CY$_2$—R'—NCO) groups in excess of one are attached to an R' radical.

Representative examples of the aryl mono primary amines which may be employed in the formation of the polyamines are aniline, the nuclear substituted phenyl amines such as ortho, meta, and para chloroaniline; ortho, meta, and para toluidine; ortho, meta, and para phenetidine; ortho, meta, and para anisidine; and ortho, meta, and para xylidine; ortho, meta, para xenyl amines, and alpha and beta naphthylamine. Mixtures of these aryl mono primary amines may also be used. Nuclear substituted aryl amines may be used so long as the substituted radical does not contain hydrogen reactive with an isocyanate group. The presence of such reactive hydrogen in the phosgenated polyamine would permit additional polymerization of the reaction product which is not desired.

Representative examples of the aldehydes and ketones which may be employed are the aliphatic aldehydes such as formaldehyde, acetaldehyde, propionaldehyde, butyraldehyde and nonylaldehyde, the aromatic aldehydes such as benzaldehyde, the aliphatic ketones such as methyl ethyl ketone, acetone, the pentanones, and hexanones, and the aromatic ketones such as acetophenone, benzophenone and propiophenone. Mixtures of these compounds may also be used.

Preferred polyisocyanates are those resulting from the phosgenation of the polyamines resulting from the reaction of aniline with formaldehyde, benzaldehyde, acetaldehyde, methyl ethyl ketone or acetone; ortho toluidine with formaldehyde, benzaldehyde, acetaldehyde, methyl ethyl ketone or acetone; ortho chloraniline with formaldehyde, benzaldehyde, acetaldehyde, methyl ethyl ketone or acetone; ortho anisidine with formaldehyde, benzaldehyde, acetaldehyde, methyl ethyl ketone, or acetone; and alpha naphthyl amine with formaldehyde, benzaldehyde, acetaldehyde, methyl ethyl ketone, or acetone.

The practice of the invention is illustrated by the following examples.

I. *Preparation of polyamine*

To 485 grams of aniline (5.2 moles) was slowly added a mixture containing 229 milliliters of concentrated hydrochloric acid and 322 grams of 37% formalin (4.03 moles formaldehyde). The temperature of the reaction mixture was kept below 83° C. by cooling. When all the reactants had been added, the solution was gradually heated to 90° C. and kept at this temperature for 5½ hours. To neutralize the acid, 117 grams of NaOH dissolved in 555 milliliters of water was added. The mixture then separated into two phases, and was steam distilled to remove any unreacted aniline. After the water layer was decanted off, the product was washed and dried. It was a clear amber-colored liquid which became a sticky solid at room temperature. Analysis showed a yield of 97.5% and a neutral equivalent of 107.2. Distillation of the product showed that 27.7% by weight distilled over the range 240–245° C. under 10 mm. pressure. This fraction, substantially pure diamine, showed a neutral equivalent of 100.1. The neutral equivalent of the pure diamine is 99. The residue (72.3% by weight) showed a neutral equivalent of 109.3. From these analyses it is apparent that here is a mixture of polyamines in which the polyamines higher than the difunctional amine predominate.

II. *Synthesis of the polyisocyanate from the polyamine*

Three hundred forty-five grams (3.5 moles) of phosgene were dissolved in 700 milliliters of chlorobenzene and chilled to below 0° C. To this solution was slowly added, with stirring, a hot solution of 2000 milliliters of chlorobenzene containing 268 grams of the aniline-formaldehyde polyamine resin prepared according to I. The temperature of the reaction mixture was held below 30° C. The resin-phosgene complex separated as a yellow solid, making a thick slurry. The reaction mixture was then slowly heated to reflux over a period of 6½ hours. During this time a slow stream of phosgene was bubbled through the mixture. Refluxing continued for 30 minutes after which the phosgene was turned off. Heating continued for 30 minutes more to remove the phosgene. The solution was cooled to room temperature and filtered. The filtrate was heated to drive off the solvent leaving a residue of resinous polyisocyanate. The amine equivalent of the product was 136.1. The amine equivalent of the pure diisocyanate is 125.

While certain representative embodiments and details have been shown for the purpose of illustrating the invention, it will be apparent to those skilled in this art that various changes and modifications may be made therein without departing from the spirit or scope of the invention.

We claim:

1. A composition of matter comprising a mixture of polyisocyanates corresponding to the formula OCN—R—(CY$_2$—R'—NCO)$_n$

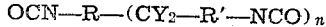

in which R and R' are arylene radicals, Y is selected from the group consisting of hydrogen, alkyl, and aryl radicals, $n$ is a whole number, and the (CY$_2$—R'—NCO) groups in excess of one are attached to an R' radical, said mixture comprising from 0% to 40% by weight of the diisocyanate and from 100% to 60% by weight of at least one polyisocyanate containing more than two —NCO equivalents per mol of polyisocyanate.

2. A composition of matter comprising a mixture of polyisocyanates corresponding to the formula OCN—R—(CHY—R'—NCO)$_n$

in which R and R' are phenylene radicals, Y is an alkyl radical, $n$ is a whole number, and the (CHY—R'—NCO) groups in excess of one are attached to an R' radical, said mixture comprising from 0% to 40% by weight of the diisocyanate and from 100% to 60% by weight of polyisocyanates containing more than two —NCO equivalents per mol of polyisocyanate.

3. A composition of matter comprising a mixture of polyisocyanates corresponding the formula OCN—R—(CH$_2$—R'—NCO)$_n$

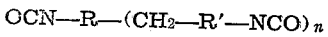

in which R and R' are phenylene radicals, $n$ is a whole number, and the (CH$_2$—R'—NCO) groups in excess of one are attached to an R' radical, said mixture comprising from 0 to 40% by weight of the diisocyanate and from 100% to 60% by weight of polyisocyanates containing more than two —NCO equivalents per mol of polyisocyanate.

4. The compositions defined by claim 1 in which R and R' are

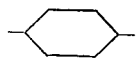

5. The compositions defined by claim 1 in which R and R' are

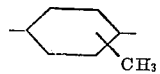

6. The compositions defined by claim 1 in which R and R' are

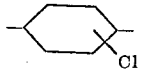

7. The compositions defined by claim 3 in which R and R' are

8. The compositions defined by claim 4 in which Y is hydrogen.

9. The compositions defined by claim 5 in which Y is hydrogen.

10. The compositions defined in claim 6 in which Y is hydrogen.

References Cited in the file of this patent

UNITED STATES PATENTS

| Number | Name | Date |
|---|---|---|
| 2,029,954 | Sutter | Feb. 4, 1936 |
| 2,437,867 | Verbanc | Mar. 16, 1948 |

FOREIGN PATENTS

| Number | Country | Date |
|---|---|---|
| 404,469 | Great Britain | Jan. 18, 1934 |

OTHER REFERENCES

Bayer, Angewandte Chemie, A/59, September 1947, p. 264.